(12) United States Patent
Shneyer et al.

(10) Patent No.: US 11,565,631 B2
(45) Date of Patent: Jan. 31, 2023

(54) TAILGATE LOCKING DEVICE AND SYSTEM

(71) Applicant: SLEEKE CORP., Brooklyn, NY (US)

(72) Inventors: Sam Shneyer, Brooklyn, NY (US); Eugene Sosnovsky, Brooklyn, NY (US)

(73) Assignee: SLEEKE CORP., Austin, TX (US)

( * ) Notice: Subject to any disclaimer, the term of this patent is extended or adjusted under 35 U.S.C. 154(b) by 223 days.

(21) Appl. No.: 17/011,356

(22) Filed: Sep. 3, 2020

(65) Prior Publication Data
US 2022/0063508 A1    Mar. 3, 2022

(51) Int. Cl.
*B60R 9/10* (2006.01)
*E05B 37/00* (2006.01)
*B60R 9/06* (2006.01)

(52) U.S. Cl.
CPC ............ *B60R 9/10* (2013.01); *E05B 37/0034* (2013.01); *B60R 9/06* (2013.01)

(58) Field of Classification Search
CPC .......... B60R 9/10; B60R 9/06; E05B 37/0034
USPC ....................................................... 224/324
See application file for complete search history.

(56) References Cited

U.S. PATENT DOCUMENTS

| | | | |
|---|---|---|---|
| 4,707,016 A | 11/1987 | McDonald | |
| D323,639 S * | 2/1992 | Creamer | D12/401 |
| 5,104,171 A * | 4/1992 | Johnsen | B62D 33/0273 296/57.1 |
| 5,255,464 A * | 10/1993 | Marecek | G09F 21/048 40/591 |
| 6,234,561 B1 | 5/2001 | Huotari | |
| 6,286,885 B1 * | 9/2001 | Ramos | B60R 13/01 296/64 |
| 6,695,556 B2 | 2/2004 | Addy | |
| 8,061,761 B1 * | 11/2011 | Sierra | G09F 21/048 296/136.01 |
| 8,602,481 B2 * | 12/2013 | Sierra | B60R 9/06 296/136.07 |
| 8,998,288 B2 | 4/2015 | Sierra | |
| 9,522,767 B1 * | 12/2016 | Pass | G09F 21/04 |
| 9,701,225 B1 | 7/2017 | Hogan et al. | |
| 10,300,861 B1 * | 5/2019 | Green | B60R 7/02 |
| 10,343,617 B2 | 7/2019 | Cox | |
| 10,696,236 B1 | 6/2020 | Starkey | |
| 10,703,295 B2 | 7/2020 | Yaffe et al. | |
| 2002/0135202 A1 * | 9/2002 | Rokahr | B62D 33/0273 296/57.1 |

(Continued)

OTHER PUBLICATIONS

Altiprime Store, atliprime Truck Tailgate Pickup Pads 54" Bike Tailgate Cover with 2 Tool Pockets for Bicycle Rack with 5 Points; Internet; https://www.amazon.com/atliprime-Tailgate-Pickup-Pockets-Bicycle/dp/B088BPF9Z2; May 8, 2020; 4 pages; Amazon; US.

*Primary Examiner* — Peter N Helvey
(74) *Attorney, Agent, or Firm* — Olav M. Underdal; IDP Patent Services

(57) ABSTRACT

A tailgate locking system, includes a tailgate pad body for mounting on a tailgate of a vehicle, including at least one bicycle holder structure, a first lock cable, a cable lock device and a lock enclosure, such that the at least one bicycle holder structure is configured to detachably secure the bicycle, such that the first lock cable is extendable through a frame of the bicycle, such that the bicycle is securely locked to the tailgate pad body.

26 Claims, 8 Drawing Sheets

(56) References Cited

U.S. PATENT DOCUMENTS

| | | | |
|---|---|---|---|
| 2003/0038497 A1* | 2/2003 | Fitzgerald | B60R 5/04 |
| | | | 296/39.1 |
| 2008/0203752 A1* | 8/2008 | Warkentin | B62D 33/0273 |
| | | | 296/57.1 |
| 2012/0118928 A1 | 5/2012 | Laws et al. | |
| 2017/0144614 A1* | 5/2017 | DePalma | B60R 13/013 |
| 2019/0337464 A1* | 11/2019 | Cox | B60R 9/06 |
| 2020/0331332 A1* | 10/2020 | Low | B60R 9/10 |

* cited by examiner

Tailgate Locking System

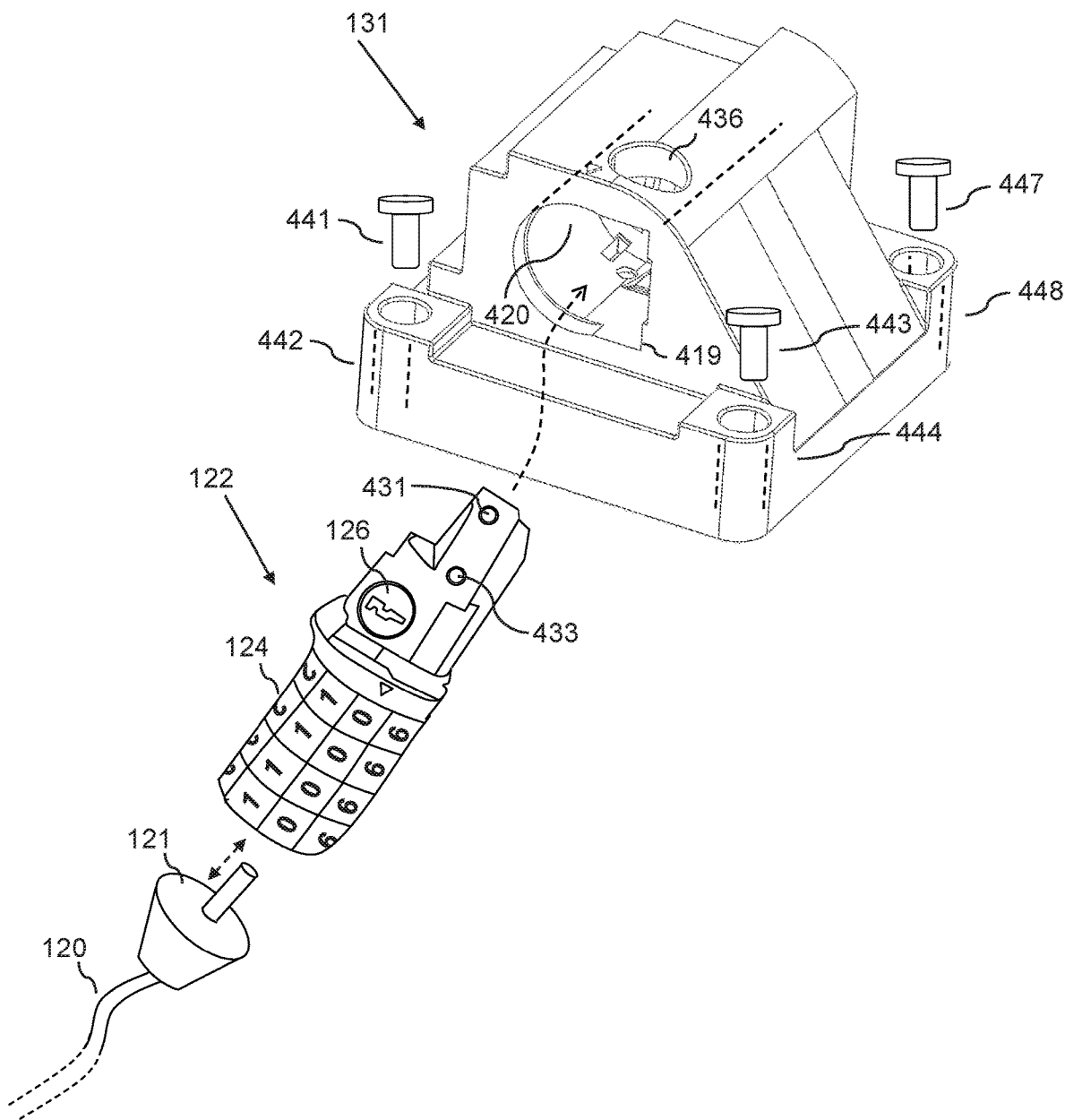

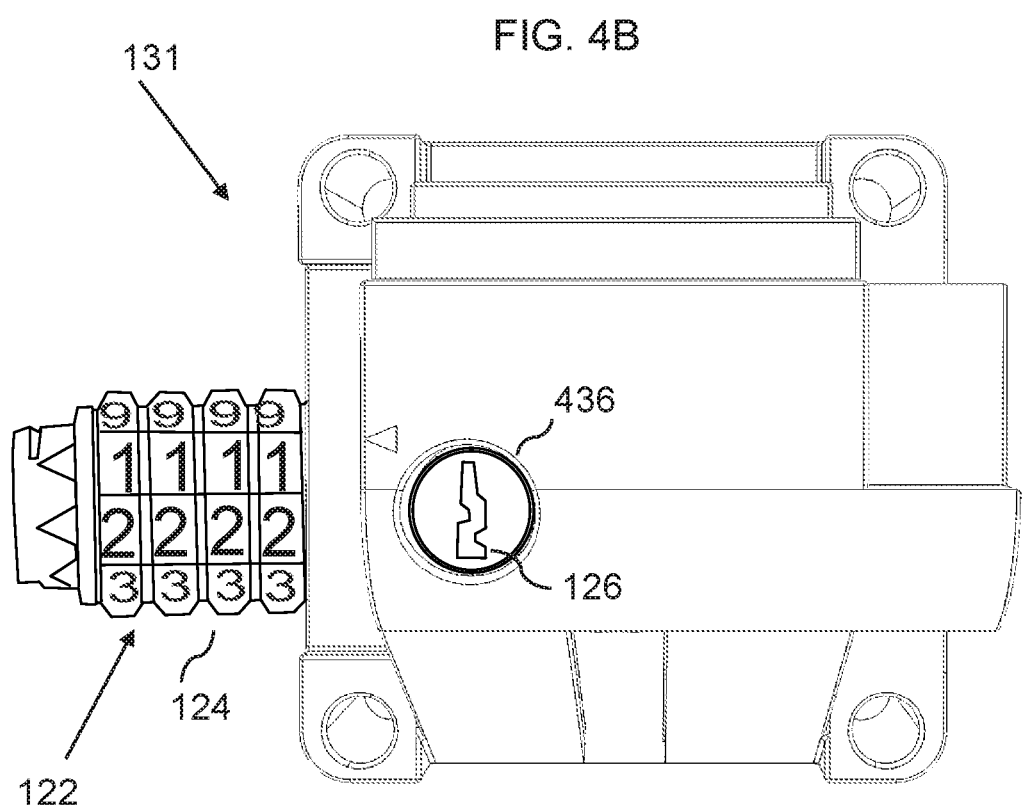

TAILGATE LOCKING DEVICE AND SYSTEM

CROSS-REFERENCE TO RELATED APPLICATIONS

N/A.

FIELD OF THE INVENTION

The present invention relates generally to the field of bike racking and transportation, and more particularly to methods and systems for mounting and locking bikes on the tailgate of a pickup truck.

BACKGROUND OF THE INVENTION

Systems for mounting bicycles on a back of a vehicle are well-known and in common usage.

However, such systems generally do not have effective locking mechanisms, and are therefore vulnerable to thieves who may be able to quickly remove bicycles.

In conventional tailgate pad systems, users may only lock the tailgate to the car which allows for theft of the bicycle, since only a strap is holding the bicycle in place. Therefore, users will have to separately chain the bicycle, using a separate cable lock.

As such, considering the foregoing, it may be appreciated that there continues to be a need for novel and improved devices and methods for mounting and locking bikes on the tailgate of a pickup truck.

SUMMARY OF THE INVENTION

The foregoing needs are met, to a great extent, by the present invention, wherein in aspects of this invention, enhancements are provided to the existing model of locking systems.

In an aspect, a tailgate locking system can include:
a) a tailgate pad body, which is configured to be mounted on a tailgate of a vehicle; and
b) at least one bicycle holder structure;
   wherein the at least one bicycle holder structure is mounted on an inner side section of a top surface of the tailgate pad body;
   such that at least one bicycle holder structure is configured to detachably secure a bicycle, such that a frame portion of the bicycle is attached to the at least one bicycle holder structure; and
c) a first lock cable, which is permanently secured to the tailgate pad body in a first end of the first lock cable;
   whereby the first lock cable is extendable through the bicycle connected to the at least one bicycle holder structure; and
d) a lock enclosure, which is mounted on the tailgate pad body and is configured to receive and secure a cable lock device on a second end of the first lock cable inside the lock enclosure;
   such that the bicycle can be attached to the tailgate pad body and be securely locked in position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4A is a top front perspective view of a lock enclosure of a tailgate locking system prior to installation inside the lock enclosure, according to an embodiment of the invention.

FIG. 4B is a top view of a lock enclosure of a tailgate locking system, with a cable lock device installed inside the lock enclosure, according to an embodiment of the invention.

DETAILED DESCRIPTION

Figure 1:
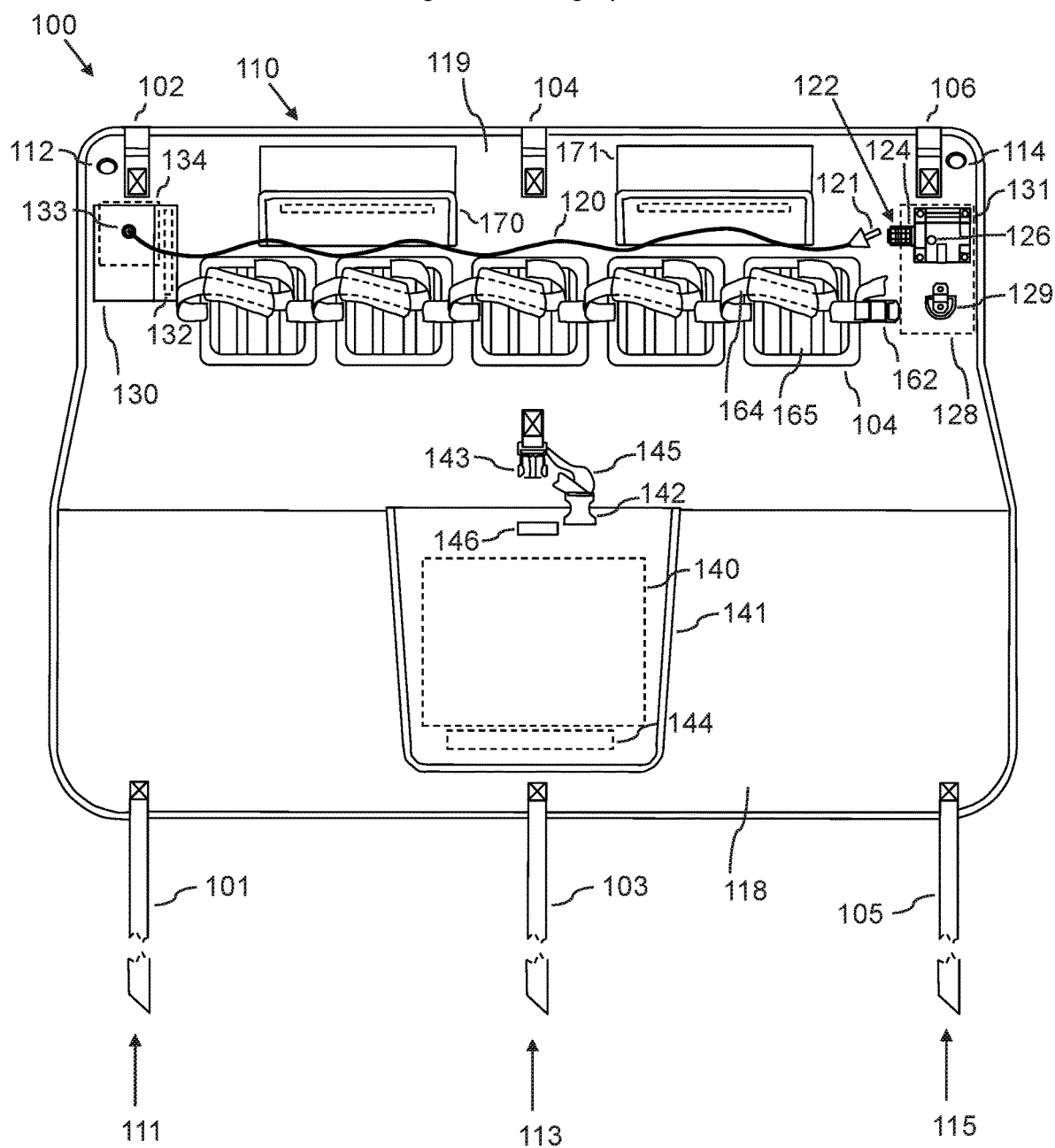
FIG. 1 is a top view of a tailgate locking system that is laid out in a flat configuration, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a tailgate locking system 100 with reference to FIG. 1, in such manner that like reference numerals refer to like components throughout; a convention that we shall employ for the remainder of this specification.

Figure 2A:
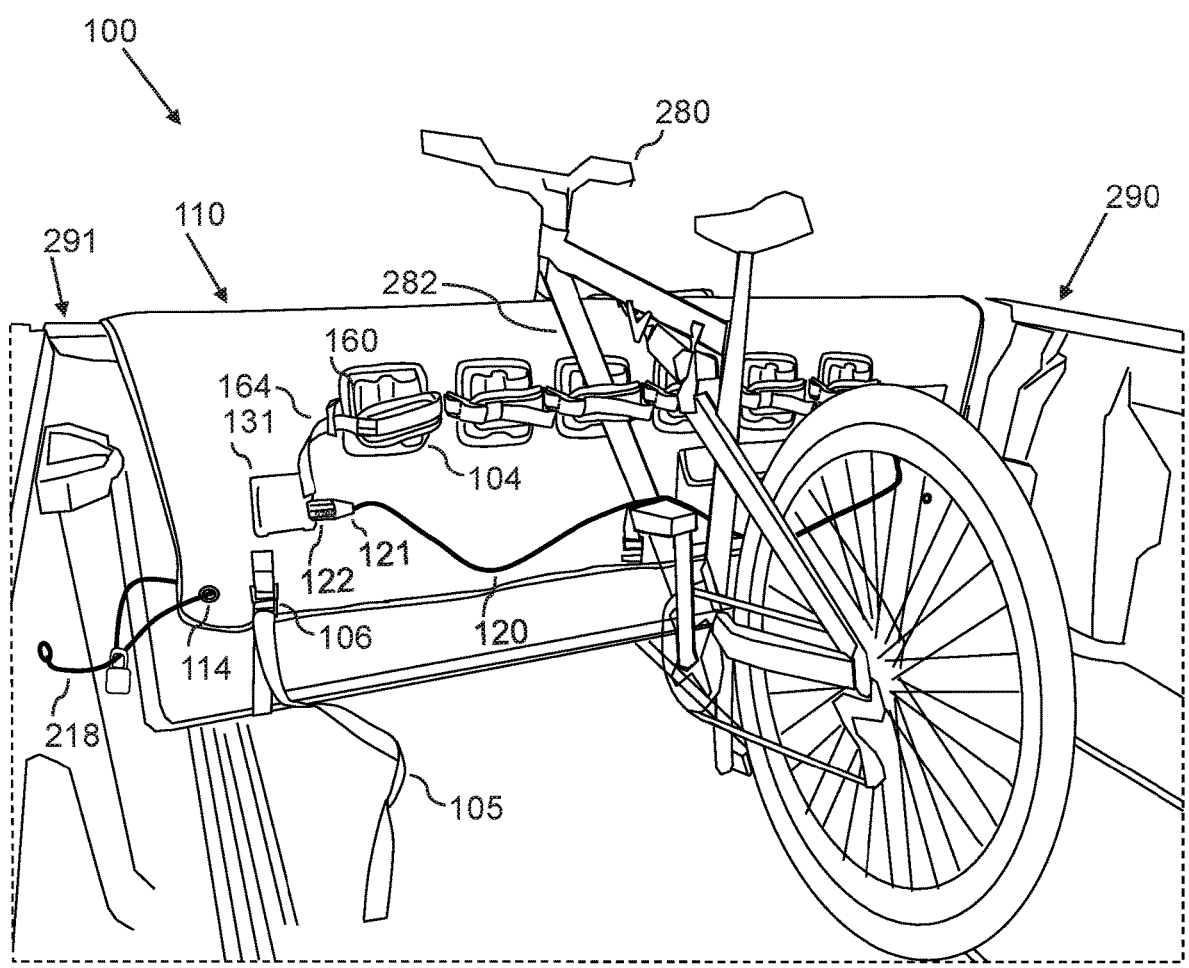
FIG. 2A is a front perspective view of a tailgate locking system, which is installed on a tailgate of a vehicle, according to an embodiment of the invention.
Figure 2B:
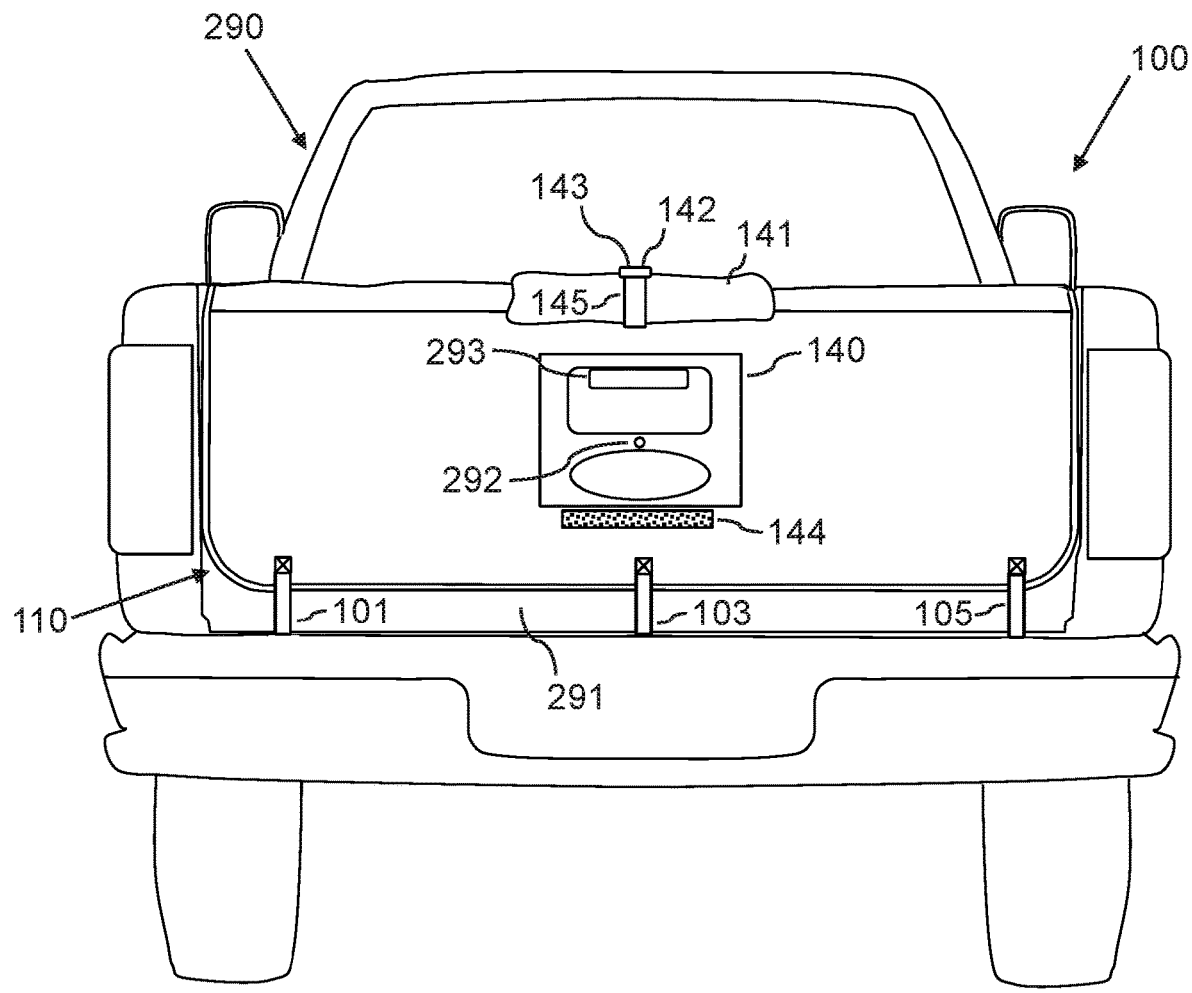
FIG. 2B is a rear perspective view of a tailgate locking system, which is installed on a tailgate of a vehicle, according to an embodiment of the invention.

In an embodiment, as shown in FIGS. 1, 2A and 2B a tailgate locking system 100 can include:
 a) a tailgate pad body 110 which can be configured to be mounted on a tailgate 291 of a vehicle 290; and
 b) at least one bicycle holder structure 160;
  wherein the at least one bicycle holder structure 160 can be mounted on an inner side section of a top surface of the tailgate pad body 110;
  such that the tailgate pad body 110 is configured to detachably secure a bicycle 280, such that at least one bicycle holder structure 160 is configured to detachably secure the bicycle 280, such that the bicycle frame 282 of the bicycle 280 is detachably attached to the at least one bicycle holder structure 160;

In an embodiment a tailgate locking system 100, as shown in FIG. 2A, can include:
 a) a first lock cable 120, which can be permanently secured to the tailgate pad body 110 in a first end of the first lock cable 133; and
 a) a cable lock device 122, which can be connected to the tailgate pad body 110, wherein the cable lock device 122 can be configured to receive a second end 121 of the first lock cable 120, such that the second end 121 of the first lock cable 120 can be lockably attachable to the cable lock device 122;
  whereby the first lock cable 120 can be extendable through the bicycle frame 282 and the second end 121 of the first lock cable 120 is lockably attachable to the tailgate pad body 110, such that the bicycle 280 can be securely locked to the tailgate pad body 110.

In another related embodiment, as shown in FIG. 2A, a tailgate locking system 100 can further include:
 a lock enclosure 131, as shown in FIGS. 1, 2A, and 4A-4F which can be mounted on the tailgate pad body 110 and can be configured to receive and secure the cable lock device 122, such that the cable lock device 122 can be non-removably positioned inside the lock enclosure 131, such that the cable lock device 122 is not removable from the lock enclosure 131;
 wherein the second end 121 of the first lock cable 120 can be configured to be received by the cable lock device 122, where in the cable lock device 122 can be secured by the lock enclosure 131, such that the bicycle 280 connected to the tailgate pad body 110 can be securely locked for safe locking.

In a further related embodiment, a tailgate locking system 100, as shown in FIG. 1, can further include:
 a) a lock enclosure mounting base plate 128 which can be made of a metal material, wherein the lock enclosure mounting base plate 128 is securely attached to the tailgate pad body 110, and for example mounted inside the tailgate pad body 110; and
 b) a mounting bracket 129 which can be made of a metal or strong plastic material, and mounted atop the lock enclosure mounting base plate 128 such that the mounting bracket 129, is configured to function as a secure mounting point;
  such that the lock enclosure mounting base plate 128 is configured to receive and secure the lock enclosure 131;
  such that the lock enclosure 131 can be securely attached to the tailgate pad body 110.

In a related embodiment, the cable lock device 122 can be a two-in-one combination lock, such that the cable lock device 122 can further include:
 a) a rotary dial selector 124, which is configured to lock and unlock the cable lock device 122, such that the rotary dial selector protrudes from a front of the lock enclosure 131; and
 b) a keyhole structure 126, which can be configured such that a key is insertable into the keyhole structure 126 to lock and unlock the cable lock device 122 such that the keyhole structure 126 can be accessible when the cable lock device 122 is connected to the lock enclosure 131.

Figure 4C:
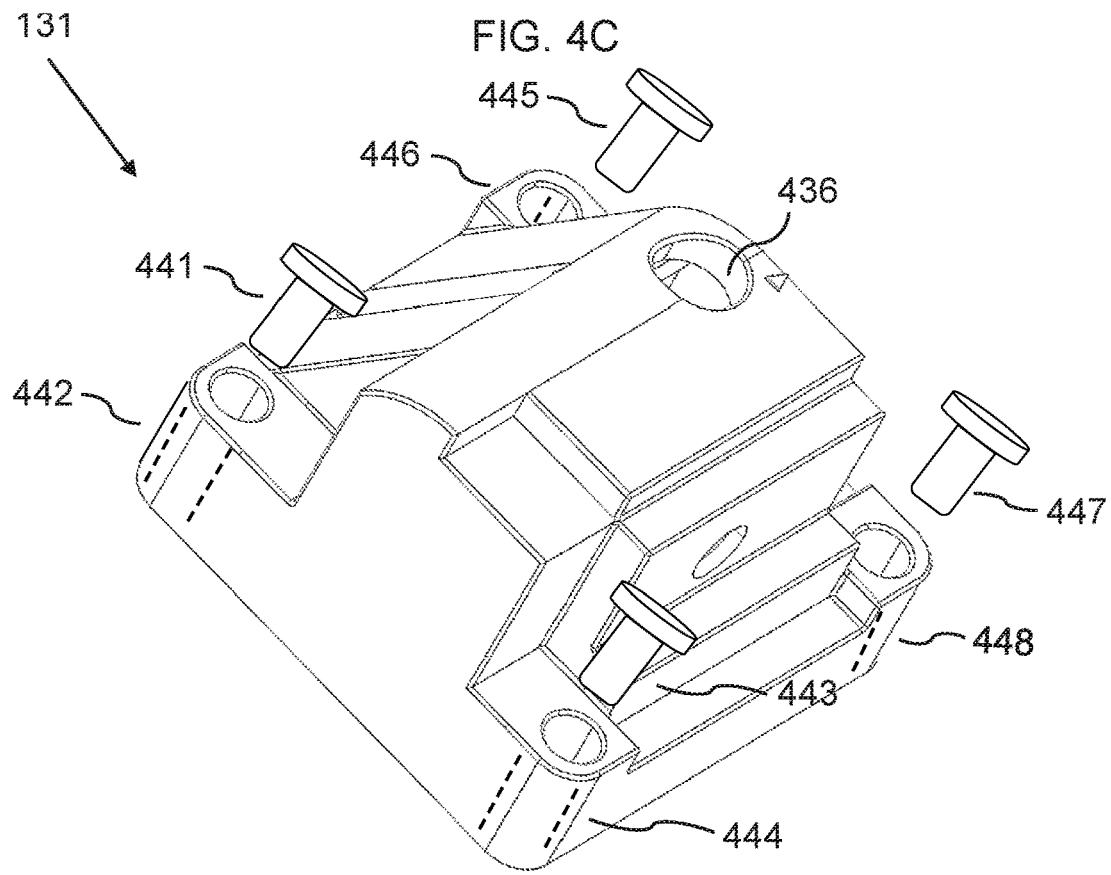
FIG. 4C is a top rear perspective view of a lock enclosure of a tailgate locking system, according to an embodiment of the invention.
Figure 4D:
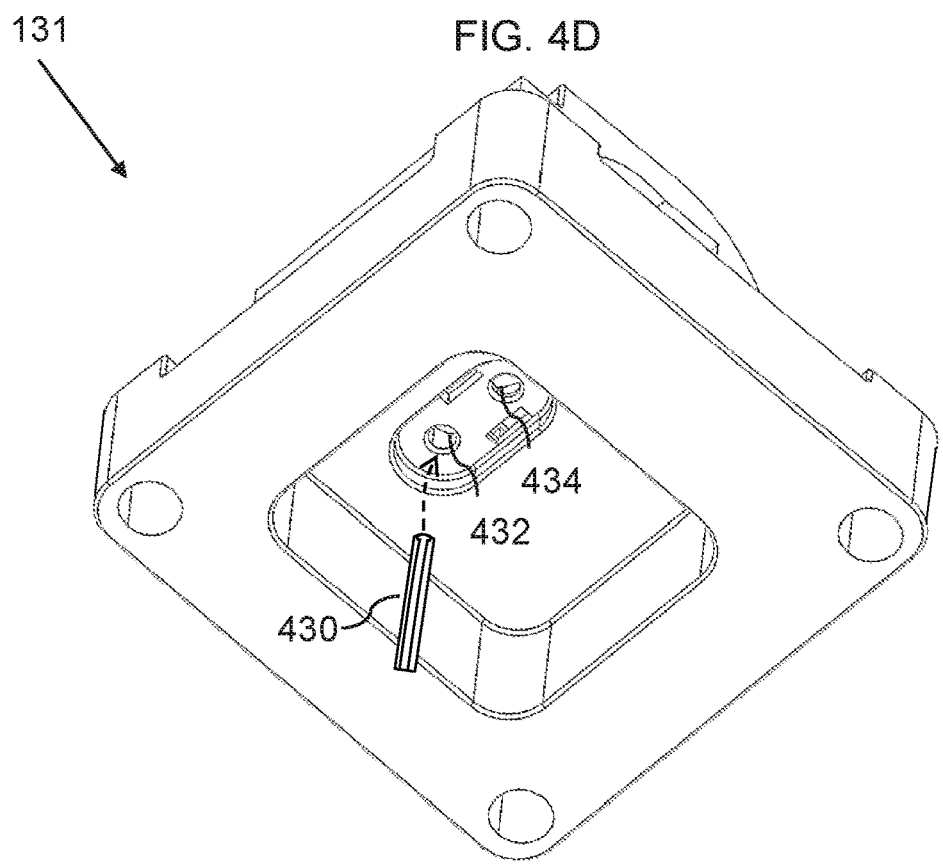
FIG. 4D is a bottom front perspective view of a lock enclosure of a tailgate locking system, according to an embodiment of the invention.
Figure 4E:
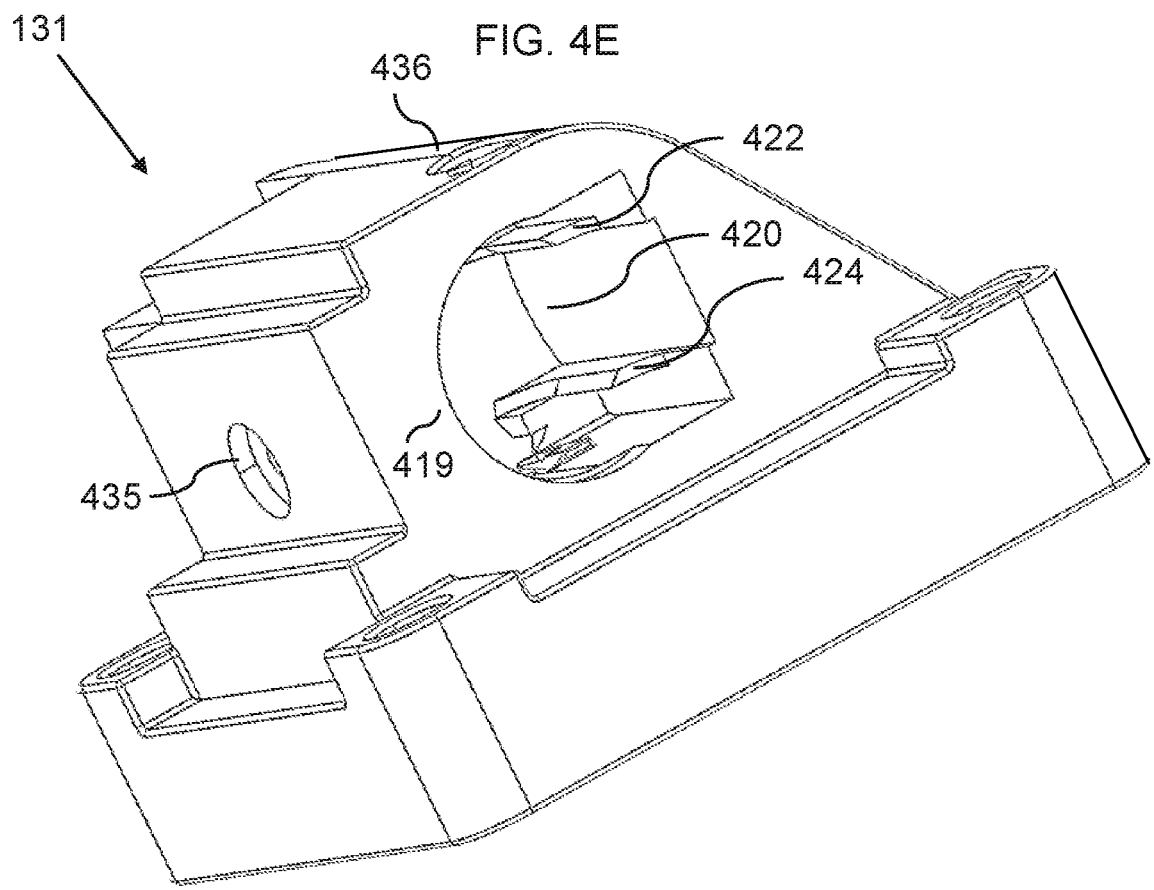
FIG. 4E is a front side perspective view of a lock enclosure of a tailgate locking system, according to an embodiment of the invention.
Figure 4F:
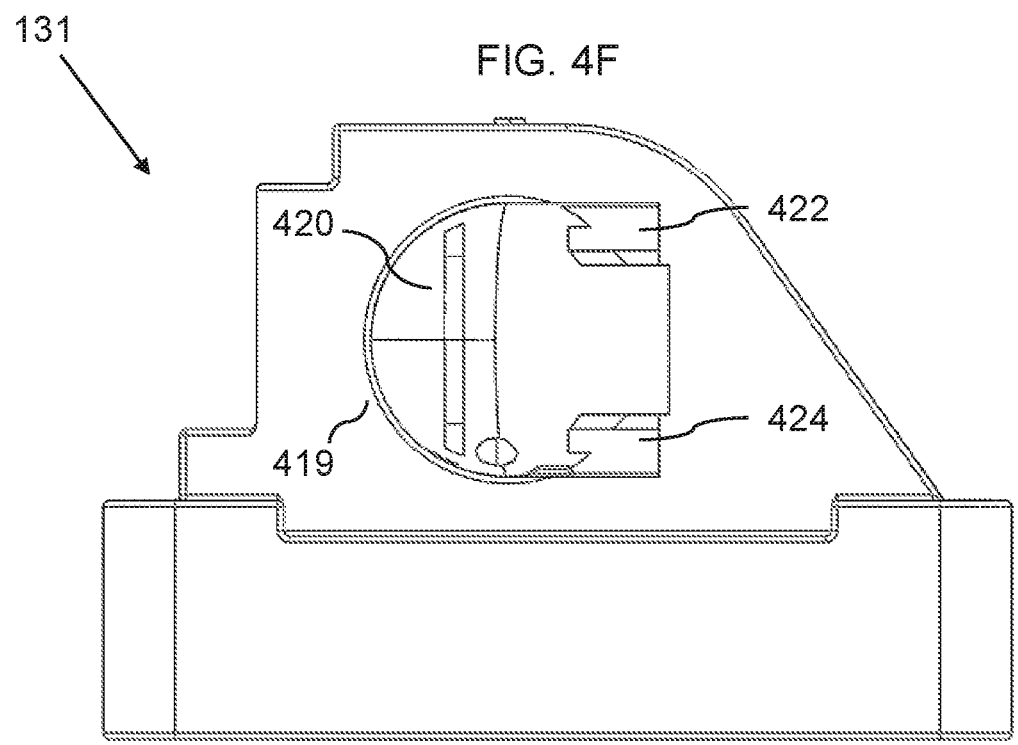
FIG. 4F is a front view of a lock enclosure of a tailgate locking system, according to an embodiment of the invention.

In a further related embodiment, as shown in FIG. 4A, the lock enclosure 131, can further include:
 a keyhole aperture 436, as shown in FIG. 4A, which can be positioned on a top portion of the lock enclosure 131;
  such that the that the keyhole structure 126 is accessible via the keyhole aperture 436, whereby the key can be inserted for locking and unlocking the cable lock device 122;

In a further related embodiment, as shown in FIGS. 4B, 4E and 4F, the lock enclosure 131, can further include;
 a) an interior 420, as shown in FIG. 4B; and
 b) a lock receiving aperture 419, which can be positioned on a left side of the lock enclosure 131, such that the lock receiving aperture can be configured to match an external shape of the cable lock device 122, such that the lock receiving aperture 419 provides access to the interior 420 of the lock enclosure 131, such that a portion of the cable lock device 122 slides into the interior 420 of the lock enclosure 131.
 such that the cable lock device 122 can be laterally secured to the interior 420.

In a further related embodiment, as shown in FIGS. 4B, 4E and 4F, the interior 420 of the lock enclosure 131, can further include;
 a) an upper lock aperture protrusion 422, as shown in FIG. 4F, which is mounted on a right side inner surface of the interior 420 of the lock enclosure 131, such that the upper lock aperture protrusion 422 is adapted to connect with a right side of the cable lock device 122, such that the cable lock device 122 is secured in position; and
 b) a lower lock aperture protrusion 424, as shown in FIG. 4F, which is mounted on the right side inner surface of the interior 420 of the lock enclosure 131, such that the lower lock aperture protrusion 424 is adapted to connect with the right side of the cable lock device 122, such that the cable lock device 122 is secured in position.
 such that the upper lock aperture protrusion 422 and the lower lock aperture protrusion 424 can be configured to receive the cable lock device 122, whereby the upper lock aperture protrusion 422 and the lower lock aperture protrusion 424 can prevent rational movement of the cable lock device 122.

In various further related embodiments, wherein the cable lock device 122 can include at least one pin aperture 431, 433, such that the lock enclosure assembly can further include at least one lock fastener 430, which for example can be a security pin 430 or a screw.

In a related embodiment, as shown in FIG. 4D, the at least one security pin 430 can be a spring pin, such that the at least one security pin 430 can be compressed when inserted into the at least one pin aperture 431, such that the at least one security pin 430 can be expanded following insertion.

In a further related embodiment, as shown in FIG. 4D the lock enclosure 131, can further include:
 a) at least one pin insert aperture 432, which can be a first lower pin insert aperture 432, as shown in FIG. 4D, which can be positioned at a lower bottom portion of the lock enclosure 131, such that the first lower pin insert aperture 432 provides access to a portion of the cable lock device 122 inside the interior 420 of the lock enclosure 131, such that the first lower pin insert aperture 432 aligns with the at least one pin aperture 431 of the cable lock device 122; and
 b) a second lower pin insert aperture 434, as shown in FIG. 4D, which can be positioned at the lower bottom portion of the lock enclosure 131, such that the second lower pin insert aperture 434 provides access to a portion of the cable lock device 122 inside the interior 420 of the lock enclosure 131, such that the second lower pin insert aperture 434 aligns with a pin aperture 433 of the cable lock device 122; and
 c) a side pin insert aperture 435 that as shown in FIG. 4E, which can be positioned at a left portion of the lock enclosure 131, such that the side pin insert aperture 435 provides access to a portion of the cable lock device 122 inside the interior 420 of the lock enclosure 131, such that the side pin insert aperture 435 aligns with a pin aperture of the cable lock device 122;
 wherein the first security pin 430 can be inserted into the first lower pin insert aperture 432, such that the first security pin protrudes into the first pin aperture 431 and contacts with the cable lock device 122;
 such that the at least one second security pin 430 can be inserted into the first lower pin insert aperture 432, such that the first security pin protrudes into the second pin aperture 433, and contacts with the cable lock device 122, in order to securely hold the cable lock device 122 in the lock enclosure 131.

In a further related embodiment, as shown in FIG. 4A, the lock enclosure 131 can further include:
 a) at least one lock enclosure rivet opening 442; and
 b) at least one lock enclosure rivet 441;
 wherein the at least one lock enclosure rivet opening 440 can be configured to receive the at least one lock enclosure rivet 441, such that the at least one lock enclosure rivet 441 can be configured to fasten the lock enclosure 131 to the lock enclosure mounting base plate 128.

In a related embodiment, as shown in FIG. 4C the lock enclosure 131 can further include:
 a) a right lock enclosure rivet opening 444; and
 b) a right lock enclosure rivet 443; and
 wherein the right lock enclosure rivet opening 444 can be configured to receive the right lock enclosure rivet 443, such that the right lock enclosure rivet 443 can be configured to fasten the lock enclosure 131 to the lock enclosure mounting base plate 128; and
 c) a rear right lock enclosure rivet opening 448; and
 d) a rear right lock enclosure rivet 447; and
 wherein the rear right lock enclosure rivet opening 448 can be configured to receive the rear right lock enclosure rivet 447, such that the rear right lock enclosure rivet 447 can be configured to fasten the lock enclosure 131 to the lock enclosure mounting base plate 128; and
 e) a rear left lock enclosure rivet opening 446, as shown in FIG. 4C; and
 f) a rear left lock enclosure rivet 445, as shown in FIG. 4C; and
 wherein the rear left lock enclosure rivet opening 446 can be configured to receive the rear left lock enclosure rivet 445, such that the rear left lock enclosure rivet 445 can be configured to fasten the lock enclosure 131 to the lock enclosure mounting base plate 128;
 whereby the four corners of the lock enclosure 131 can be securely mounted to the lock enclosure mounting base plate 128.

In another related embodiment, as shown in FIGS. 1 and 2A, a tailgate locking system 100 can further include:
 a cable pocket 130, which is permanently connected to the tailgate pad body 110, for example with hidden bolts and/or use of an epoxy based adhesive,
 such that the cable pocket 130 is configured to enclose the first end of first lock cable 133 inside the cable pocket 130;
 such that the first lock cable 120 can be configured to connect to the tailgate pad body 110, the first end of the first lock cable 133 connecting at the cable pocket 130, such that the first lock cable 120 can travel through the bicycle 280 and wherein the second end 121 of the first lock cable 120 can be secured by the cable lock device 122 in the lock enclosure 131 such that the bicycle 280 can be securely locked for safe storage;
 wherein cable pocket 130 can be configured to store the first lock cable 120 when not in use.

In a further related embodiment, as shown in FIG. 1, a tailgate locking system 100 can further include:
 a cable pocket mounting base plate 134 which can be made of a resilient metal material, wherein the cable pocket mounting base plate 134 is securely attached to the tailgate pad body 110;
 where in the first lock cable 120 can be secured onto the cable pocket mounting base plate 134;
 such that the cable pocket 130 can be securely attached atop the cable pocket mounting base plate 134;
 such that the cable pocket 130 can be securely attached to the tailgate pad body 110;

In a further related embodiment, as shown in FIG. 1, the cable pocket 130, can further include;
 a hook and loop fastener pocket connection 132, such as VELCRO™, that can be located on the cable pocket 130, such that the cable pocket 130 can be connected and securely closed for storage.

In various further related embodiments, the cable pocket 130 and the lock enclosure 131 in conjunction can facilitate use for a multitude of different applications and can be alternatively configured to be directly affixed to the tailgate 291 as a multi-use locking system.

Figure 3A:
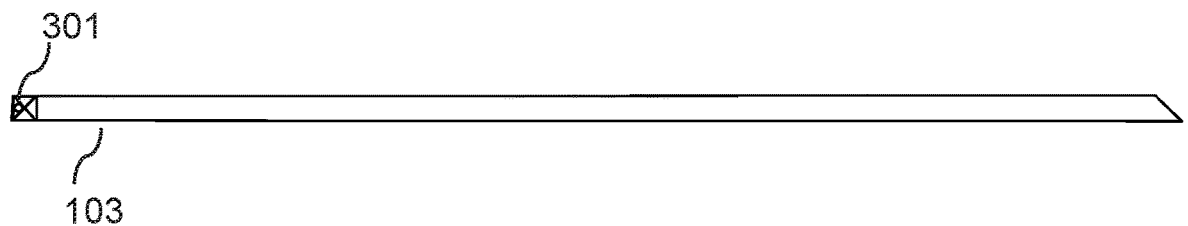
FIG. 3A is a top view of a mounting strap of a tailgate locking system, according to an embodiment of the invention.
Figure 3B:
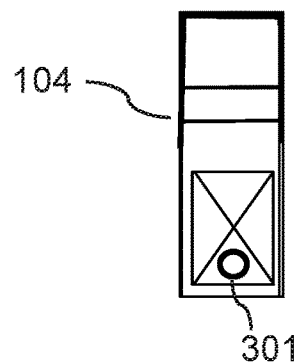
FIG. 3B is a top view of a mounting strap receiver of a tailgate locking system, according to an embodiment of the invention.

In an embodiment, as shown in FIGS. 1 and 2B, a tailgate pad body 110 can include:
 a) a mounting strap assembly 113, as shown in FIG. 1 which can include:

i. a mounting strap 103, as shown in FIG. 3A which can be attached to an outer end 118 of the tailgate pad body 110, such that the mounting strap 103 can extend (i.e. extends) from the outer end of the tailgate pad body 110, wherein the mounting strap 103 can be looped under a lower portion of the tailgate 291; and ii. a mounting strap receiver 104, as shown in FIG. 3B, which can be attached to an inner end 119 of the tailgate pad body 110;

whereby the mounting strap receiver 104 can be a toothed cam buckle, such that the mounting strap assembly 113 can securely fasten and unfasten;

such that a connection of the mounting strap receiver 104 and the mounting strap 103 is configured to be releasably detachable;

wherein the mounting strap receiver 104 can be configured to receive the mounting strap 103 when the tailgate pad body 110 is folded over the tailgate 291; and whereby the tailgate pad body 110 is stably and securely positionable in a convenient position on the tailgate 291.

In a further related embodiment, as shown in FIGS. 1, 2A, 2B, and 3A, a tailgate pad body 110 can further include:

a) a left mounting strap assembly 111, as shown in FIG. 1 which can include:

i. a left mounting strap 101, as shown in FIG. 3A, which can be attached to the outer end 118 of the tailgate pad body 110 wherein the left mounting strap 101 can extend (i.e. extends) from the outer end 118 of the tailgate pad body 110, wherein the left mounting strap 101 can be looped under a lower portion of the tailgate 291; and ii. a left mounting strap receiver 102 as shown in FIG. 3B, which can be attached to the inner end 119 of the tailgate pad body 110;

whereby the left mounting strap receiver 102 can be a toothed cam buckle, such that the left mounting strap assembly 111 can securely fasten and unfasten;

such that a connection of the left mounting strap receiver 102 and the left mounting strap 101 is configured to be releasably detachable;

b) a right mounting strap assembly 115, as shown in FIG. 1 which can include:

i. a right mounting strap 105, as shown in FIG. 3A, which can be attached to the outer end 118 of the tailgate pad body 110 wherein the right mounting strap 105 can extend (i.e. extends) from the outer end 118 of the tailgate pad body 110, wherein the right mounting strap 105 can be looped under a lower portion of the tailgate 291; and ii. a right mounting strap receiver 104 as shown in FIG. 3B, which can be attached to the inner end 119 of the tailgate pad body 110;

whereby the right mounting strap receiver 104 can be a toothed cam buckle, such that the right mounting strap assembly 115 can securely fasten and unfasten;

such that a connection of the right mounting strap receiver 104 and the right mounting strap 105 is configured to be releasably detachable;

such that left mounting strap assembly 111 and the right mounting strap assembly 115 can provide further stability in attachment the tailgate pad body 110 to the tailgate 291;

In another related embodiment, as shown in FIG. 1, the tailgate pad body 110 can further include:

a) a left security aperture 112, as shown in FIG. 1, which can be positioned on a lower left portion of the inner side section of the tailgate pad body 110;

b) a right security aperture 114, as shown in FIG. 1, which can be positioned on a lower right portion of the inner side section of the tailgate pad body 110;

such that at least one security lock cable 218, as shown in FIG. 2A, can be attachable through the left security aperture 112 and the right security aperture 114, respectively, and the at least one security lock cable 218 can be connectable to the vehicle 290, such that the tailgate pad body 110 is secured to the vehicle 290.

In an embodiment, as shown in FIGS. 1 and 2B, the tailgate pad body 110 can include:

a) a flap aperture 140, as shown in FIG. 1, which can be positioned on the tailgate pad body 110, such that the flap aperture 140 can be square shaped, such that the flap aperture 140 can be configured to provide access to a portion of the tailgate 291 of the vehicle 290;

whereby the flap aperture 140 can be configured to provide access to a back camera 293 and a tailgate handle 292 of the tailgate 291 as shown in FIG. 2B.

In an embodiment, as shown in FIGS. 1 and 2B, the tailgate pad body 110 can further include:

a central flap portion 141, which can be connected to the tailgate pad body 110 above the flap aperture 140 such that the central flap portion 141 removably covers the flap aperture 140.

Figure 3C:
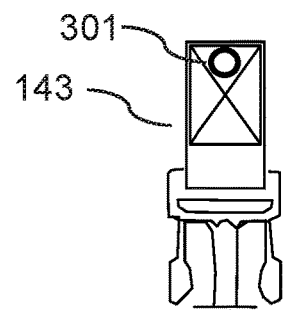
FIG. 3C is a top view of a snap-in connector of a tailgate locking system, according to an embodiment of the invention.

In an embodiment, as shown in FIGS. 1 and 2B, the tailgate pad body 110 can further include:

b) a flap mounting strap 145, as shown in FIG. 1, which can be connected to the inner side section of the top surface of the tailgate pad body in a first end of the flap mounting strap; and a) a body connector 143, as shown in FIG. 3C, which can be positioned on the inner side section of the top surface of the tailgate pad body 110, whereby a first end of the flap mounting strap 145; and b) a strap connector 142, which can be connected to and extend from a second end of the flap mounting strap 145; and wherein the body connector 143 is configured to detachably connect to the strap connector 142.

In a related embodiment, as shown in FIG. 1, the tailgate pad body 110 can include:

a strap connector aperture 146, as shown in FIG. 1, which can be positioned on an upper portion of the central flap portion 141;

wherein the strap connector aperture 146 can be configured such that the flap mounting strap 145 can be inserted through the strap connector aperture 146;

such that when the central flap portion 141 is rollably positioned (i.e. rolled up) above the flap aperture 140, the flap mounting strap 145 can be looped under a lower portion of the central flap portion 141, such that the strap connector 142 is configured to detachably connect to the body connector 143 on the tailgate pad body 110, whereby the central flap portion 141 is held above the flap aperture 140 as shown in FIG. 2B, such that the back camera 293 and the tailgate handle 292 of the tailgate 291 can be exposed for convenient access.

In a related embodiment, as shown in FIGS. 1 and 2B, the tailgate pad body 110 can include:

a hook and loop fastener flap connection 144, such as VELCRO™, that can be located on the tailgate pad body such that the central flap portion 141 can be connected and securely held to the tailgate pad body 110;

whereby the central flap portion 141 can adhesively connect to the hook and loop fastener flap connection 144 for alternate concealment of the back camera 293 and the tailgate handle 292;

In a further related embodiment, as shown in FIG. 3B, the tailgate locking system 100 can further include:

at least one security grommet 301, as shown in FIGS. 3B and 3C, wherein the at least one security grommet 301 can be configured to securely hold the connection of, for example, the strap connector 142 to the tailgate pad body 110.

Figure 3D:
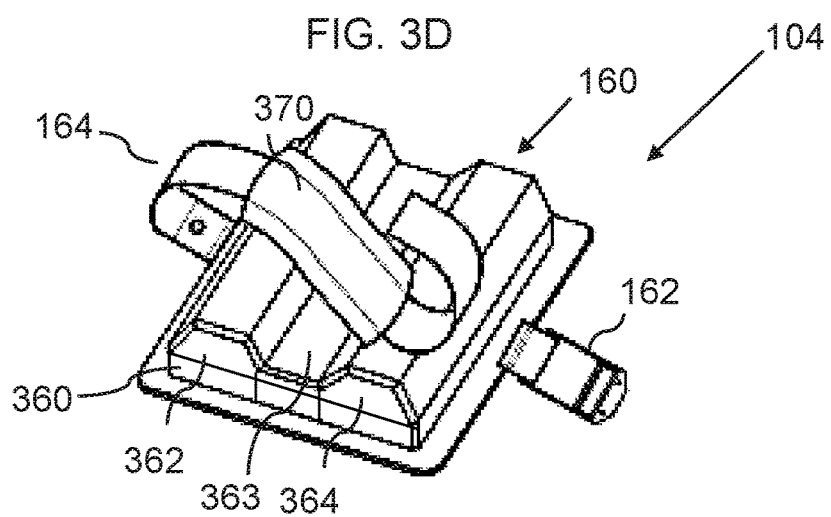
FIG. 3D is a perspective view of a bicycle holder structure of a tailgate locking system, according to an embodiment of the invention.

In a further related embodiment, as shown in FIG. 3D, wherein:

a) the at least one bicycle holder structure 160 can further include:
   i. a frame indentation 165, as shown in FIG. 1 that can be made of a foam material, configured to receive the bicycle frame 282 of the bicycle 280; and
   ii. a holder connector 162, which can be a toothed cam buckle, wherein the holder connector 162 can be connected to a first side of the at least one bicycle holder structure 160, In an embodiment, as shown in FIG. 3D, the at least one bicycle holder structure 160 can further include:

a) a tightening strap 164, which can be connected to a second side of the at least one bicycle holder structure 160, wherein the tightening strap 164 can be configured to detachably connect to the holder connector 162; and such that the tightening strap 164 can be configured to connect a multitude of the at least one bicycle holder structure 160, wherein the tailgate locking system 100 can be configured to receive and hold a multitude of bicycles 280; wherein the tightening strap 164 can be further configured to secure the bicycle frame 282 to the at least one bicycle holder structure 160;

In an embodiment, as shown in FIG. 3D, the tightening strap 164 can further include:

a tightening strap cushioning pad 370, as shown in FIG. 3D;

wherein the tightening strap cushioning pad 370 can mounted on a central portion of the tightening strap 164 whereby the tightening strap cushioning pad 370 can be configured to provide light cushioning to the bicycle frame 282 when the bicycle frame 282 is attached to the at least one bicycle holder structure 160.

In a further related embodiment, as shown in FIG. 3D, the at least one bicycle holder structure 160 can further include:

a) a lifting base 360, as shown in FIG. 3D, which can provide cushioning for the bicycle frame 282; and b) a left elongated protrusion 362, as shown in FIG. 3D, which can be trapezoidal in shape,
   wherein the left elongated protrusion 362 can be mounted on a left side of a top of the lifting base 360, such that the left elongated protrusion 362 can be configured to support a left side of the bicycle frame 282; and c) a right elongated protrusion 364, as shown in FIG. 3D, which can be trapezoidal in shape,
   wherein the right elongated protrusion 364 can be mounted on a right side of the top of the lifting base 360, such that the right elongated protrusion 364 can be configured to support a right side of the bicycle frame 282;

wherein the left elongated protrusion 362 and the right elongated protrusion 364 are in parallel;

such that a central elongated aperture 363 is defined between the left elongated protrusion 362 and the right elongated protrusion 364, as shown in FIG. 3D, such that the central elongated aperture 363 can be trapezoidal in shape, wherein the central elongated aperture 363 can be configured to receive the bicycle frame 282;

such that the frame indentation 165, is configured to receive and securely hold and prevent movement of the bicycle frame 282.

In further related embodiment, as shown in FIG. 1 the tailgate pad body 110 can further include:

a) a first pocket 170, which can be mounted the inner side section of the top surface of the tailgate pad body 110; and b) a second pocket 171, which can be mounted the inner side section of the top surface of the tailgate pad body 110;

whereby the first pocket 170 and the second pocket 171 can be configured to provide convenient storage.

In various related embodiments, the tailgate locking system 100 can be a bicycle racking and transportation system solely for pickup trucks, such that the tailgate pad body 110 can act as a protection layer between the bicycle frame 282 and the tailgate 291.

In various further related embodiments, the tailgate pad body 110 can be a standard piece customized to specifications, the lock enclosure 131 can be a plastic mold with openings for rivet mounting, the lock enclosure 131 accepts a the cable lock device 122, which can be two-in-one combination system, where in the lock enclosure 131 further secures the cable lock device 122 via the at least one security pin 430 at the underside location of the lock enclosure 131, the lock enclosure 131 can be mounted to the lock enclosure mounting base plate 128 which can be a ⅛" thick plastic metal sheet on the tailgate pad body 110 for security, the opposite side mounts the first lock cable 120 with the cable lock device 122 such that the first lock cable 120 will pass through the bicycle 280 and attach to the lock enclosure 131, the two-in-one combination lock allows to open the cable lock device 122 with a key or a combination if the code is forgotten.

The tailgate pad body 110 can include an interior cushion, exterior hard material, and soft underside microfiber material, such that the tailgate pad body 110 can be draped over the tailgate 291 of a vehicle 290, the interior side contains custom extruded padding with toothed cam buckles that wrap around the bicycle frame 282 and secure it in place, initially the bicycle 280 can be mounted on the tailgate 291 with the front wheels of the bicycle 280 outside of tailgate 291 and parallel to a truck bed, after the bicycle frame 282 is secured by the tightening strap 164, the tailgate pad body 110 can be connected to the inside of the tailgate 291 of the vehicle 290 using any generic lock and bicycle chain, the security # locks into the tailgate pad body 110 through either the left security aperture 112 or the right security aperture 114 such that the other end of the generic lock and bicycle chain locks to the vehicle 290, such can prevent the theft of the tailgate pad body 110 itself, furthermore, the lock enclosure 131 can be mounted to the inside of the tailgate pad body 110 and hosted by the lock enclosure mounting base plate 128. The first lock cable 120 can be held inside the opposite end in a cable pocket 130, mounted also to a metal frame backing, wherein the first lock cable 120 extrudes and can wrap around the bicycle frame 282, the second end 121 of the first lock cable 120 connects back into the lock enclosure 131 and the bicycle can be secure from theft.

Past technologies include similar dimension tailgate pads. Aside from the patented locking mechanism our tailgate improves on many fronts.
  a) toothed cam buckles for easy loop threading and prevention of loop loosening.
  b) enhanced backing for additional protection between the car and the bicycle frame.
  c) custom molded bike hosting pads with loops and cam buckles for protection and anti-movement during the ride.

The tailgate locking system 100 can for example provide a solution to users who stop at gas stations or would like to leave their bicycles in the truck bed overnight when camping or taking long trips. The rigid exterior material combined with metal backing plates for the extruded lock, add a convenience and an anti-theft method which integrates a feature that many customers complain is missing in the industry. The reinforced connection points of the lock and cable combined with the integrated locking feature are unseen in the marketplace.

Here has thus been described a multitude of embodiments of the tailgate locking system 100 device, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A tailgate locking system, comprising:
  a) a tailgate pad body, which is configured to be mounted on a tailgate of a vehicle;
  b) at least one bicycle holder structure;
  c) a first lock cable, which is permanently secured to the tailgate pad body in a first end of the first lock cable; and
  d) cable lock device, which is connected to the tailgate pad body,
    wherein the cable lock device is configured to receive a second end of the first lock cable, such that the second end of the first lock cable is lockably attachable to the cable lock device;
  wherein the at least one bicycle holder structure is mounted on an inner side section of a top surface of the tailgate pad body;
  such that the at least one bicycle holder structure is configured to detachably secure a bicycle, such that a bicycle frame of the bicycle is detachably attached to the at least one bicycle holder structures;
  whereby the first lock cable is extendable through the bicycle frame and the second end of the first lock cable is lockably attachable to the tailgate pad body, such that the bicycle is securely locked to the tailgate pad body.

2. The tailgate locking system of claim 1, further comprising:
  a lock enclosure, which is mounted on the tailgate pad body and is configured to receive and secure the cable lock device, such that the cable lock device is not removable from the lock enclosure.

3. The tailgate locking system of claim 2, wherein the cable lock device is a two-in-one combination lock, further comprising:
  a) a rotary dial selector, which is configured to lock and unlock the cable lock device, such that the rotary dial selector protrudes from a front of the lock enclosure; and
  b) a keyhole structure, which is configured such that a key is insertable into the keyhole structure to lock and unlock the cable lock device,
    such that the keyhole structure is accessible when the cable lock device is connected to the lock enclosure.

4. The tailgate locking system of claim 3, wherein the lock enclosure further comprises:
  a keyhole aperture, which is positioned on a top portion of the lock enclosure, such that the keyhole structure is accessible via the keyhole aperture.

5. The tailgate locking system of claim 2, wherein the lock enclosure further comprises:
  an interior; and
  a lock receiving aperture, which is positioned on a left side of the lock enclosure, such that the lock receiving aperture is configured to match an external shape of the cable lock device, such that the lock receiving aperture provides access to the interior of the lock enclosure, such that a portion of the cable lock device slides into the interior of the cable lock device.

6. The tailgate locking system of claim 5, further comprising:
  a) an upper lock aperture protrusion, which is mounted on a right side inner surface of the interior of the cable lock device, such that the upper lock aperture protrusion is adapted to connect with a right side of the cable lock device, such that the cable lock device is secured in position; and
  b) a lower lock aperture protrusion, which is mounted on the right side inner surface of the interior of the cable lock device, such that the lower lock aperture protrusion is adapted to connect with the right side of the cable lock device, such that the cable lock device is secured in position.

7. The tailgate locking system of claim 5, further comprising at least one security pin; wherein the cable lock device further comprises:
  at least one pin aperture; and
  wherein the lock enclosure further comprises:
  at least one pin insert aperture, which is positioned in a lower bottom portion of the lock enclosure,
  such that the at least one pin insert aperture provides access to the portion of the cable lock device inside the interior of the lock enclosure, such that the at least one pin insert aperture aligns with the at least one pin aperture of the cable lock device;
  wherein the at least one security pin is inserted into the at least one pin insert aperture, such that the at least one security pin protrudes into the at least one pin aperture and contacts with cable lock device, in order to securely hold the cable lock device in the lock enclosure.

8. The tailgate locking system of claim 1, further comprising:
  a cable pocket, which is connected to the tailgate pad body;

such that the cable pocket is configured to enclose the first end of the first lock cable inside the cable pocket;

such that the cable pocket is configured to store the first lock cable when the first lock cable is not in use.

9. The tailgate locking system of claim 1, further comprising:
 at least one mounting strap assembly, which comprises:
 a) a mounting strap, which is attached to an outer end of the tailgate pad body, such that the mounting strap extends from the outer end of the tailgate pad body, wherein the mounting strap is looped under a lower portion of the tailgate; and
 b) a mounting strap receiver, which is attached to an inner end of the tailgate pad body;
 such that a connection of the mounting strap receiver and the mounting strap is configured to be detachable;
 wherein the mounting strap receiver is configured to receive the mounting strap, when the tailgate pad body is folded over the tailgate.

10. The tailgate locking system of claim 9, wherein the mounting strap receiver is a toothed cam buckle.

11. The tailgate locking system of claim 1, wherein the tailgate pad body further comprises:
 a) a left security aperture which is positioned on a lower left portion of the inner side section of the tailgate pad body; and
 b) a right security aperture which is positioned on a lower right portion of the inner side section of the tailgate pad body;
 such that at least one security lock cable is attachable to at least one of the right security aperture and the left security aperture and the security lock cable is connectable to the vehicle, such that the tailgate pad body is secured to the vehicle.

12. The tailgate locking system of claim 1, wherein the tailgate pad body further comprises:
 a flap aperture, which is positioned on the tailgate pad body, such that the flap aperture is configured to provide access to a portion of the tailgate of the vehicle.

13. The tailgate locking system of claim 12, wherein the tailgate pad body further comprises:
 a central flap portion, which is connected to the tailgate pad body above the flap aperture, such that the central flap portion removably covers the flap aperture.

14. The tailgate locking system of claim 13, wherein the tailgate pad body further comprises:
 a) a flap mounting strap, which is connected to the inner side section of the top surface of the tailgate pad body in a first end of the flap mounting strap;
 b) a body connector, which is positioned on the inner side section of the top surface of the tailgate pad body, whereby a first end of the flap mounting strap is configured to connect and extend from a lower portion of the body connector; and
 c) a strap connector, which is connected to a second end of the flap mounting strap;
 wherein the body connector is configured to detachably connect to the strap connector.

15. The tailgate locking system of claim 14, wherein the central flap portion
 a strap connector aperture which is positioned on an upper portion of the central flap portion;
 wherein the strap connector aperture is configured such that the flap mounting strap is insertable through the strap connector aperture;
 such that when the central flap portion is rollably positioned above the flap aperture, the flap mounting strap is looped under a lower portion of the central flap portion when the central flap portion is rollably positioned above the flap aperture, such that the strap connector is configured to connect to the body connector on the tailgate pad body, whereby the central flap portion is held above the flap aperture.

16. The tailgate locking system of claim 1, wherein the bicycle holder structure further comprises:
 a) a holder connector, which is connected to a first side of the at least one bicycle holder structure; and
 b) a tightening strap, which is connected to a second side of the at least one bicycle holder structure, such that the tightening strap is configured to detachably connect to the holder connector;
 whereby the tightening strap is configured to secure the bicycle frame to the at least one bicycle holder structure.

17. The tailgate locking system of claim 16, wherein the holder connector is a toothed cam buckle.

18. The tailgate locking system of claim 16, wherein the at least one bicycle holder structure further comprises:
 a) a cushioning pad;
 wherein the cushioning pad is mounted on a central portion of the tightening strap, whereby the cushioning pad is configured to provide cushioning to the bicycle frame, when the bicycle frame is attached to the bicycle holder structure.

19. The tailgate locking system of claim 1, wherein the at least one bicycle holder structure further comprises:
 a) a lifting base, which provides cushioning for the bicycle frame;
 b) a left elongated protrusion, which is mounted on a left side of a top of the lifting base, such that the left elongated protrusion is configured to support a left side of the bicycle frame; and
 c) a right elongated protrusion which is mounted on a right side of the top of the lifting base, such that the right elongated protrusion is configured to support a right side of the bicycle frame;
 wherein the left elongated protrusion and the right elongated protrusion are parallel;
 such that a central elongated aperture is defined between the left elongated protrusion and the right elongated protrusion, such that the central elongated aperture is configured to receive the bicycle frame.

20. A tailgate locking system comprising:
 a) a tailgate pad body, which is configured to be mounted on a tailgate of a vehicle;
 b) a first lock cable, which is permanently secured to the tailgate pad body in a first end of the first lock cable;
 c) a cable lock device, which is connected to the tailgate pad body,
 d) a lock enclosure, which is mounted on the tailgate pad body, such that a portion of the cable lock device is non-removably positioned inside the lock enclosure, such that the cable lock device is configured to receive a second end of the first lock cable, such that the second end of the first lock cable is lockably attachable to the cable lock device;
 such that the tailgate pad body is configured to detachably secure a bicycle, such that a bicycle frame of the bicycle is detachably attached to the tailgate pad body;
 whereby the first lock cable is extendable through the bicycle frame and the second end of the first lock cable is lockably attachable to the tailgate pad body, such that the bicycle is securely locked to the tailgate pad body.

21. The tailgate locking system of claim 20, further comprising:
 at least one bicycle holder structure;
 wherein the at least one bicycle holder structure is mounted on an inner side section of a top surface of the tailgate pad body;
 such that the at least one bicycle holder structure is configured to detachably secure the bicycle, such that a bicycle frame of the bicycle is detachably attached to the at least one bicycle holder structure.

22. The tailgate locking system of claim 20, further comprising at least one security pin; wherein the cable lock device further comprises:
 at least one pin aperture; and
 wherein the lock enclosure further comprises:
 at least one pin insert aperture, which is positioned in a lower bottom portion of the lock enclosure,
 such that the at least one pin insert aperture provides access to the portion of the cable lock device inside the lock enclosure, such that the at least one pin insert aperture aligns with the at least one pin aperture of the cable lock device;
 wherein the at least one security pin is inserted into the at least one pin insert aperture, such that the at least one security pin protrudes into the at least one pin aperture and contacts with cable lock device, in order to securely hold the cable lock device in the lock enclosure.

23. The tailgate locking system of claim 20, wherein the at least one bicycle holder structure further comprises:
 a) a lifting base, which provides cushioning for the bicycle frame;
 b) a left elongated protrusion, which is mounted on a left side of a top of the lifting base, such that the left elongated protrusion is configured to support a left side of the bicycle frame; and
 c) a right elongated protrusion which is mounted on a right side of the top of the lifting base, such that the right elongated protrusion is configured to support a right side of the bicycle frame;
 wherein the left elongated protrusion and the right elongated protrusion are parallel;
 such that a central elongated aperture is defined between the left elongated protrusion and the right elongated protrusion, such that the central elongated aperture is configured to receive the bicycle frame.

24. A tailgate locking system, comprising:
a) a tailgate pad body, which is configured to be mounted on a tailgate of a vehicle, wherein the tailgate pad body further comprises:
 a flap aperture, which is positioned on the tailgate pad body, such that the flap aperture is configured to provide access to a portion of the tailgate of the vehicle; and
 a central flap portion, which is connected to the tailgate pad body above the flap aperture, such that the central flap portion removably covers the flap aperture; and b) at least one bicycle holder structure;
wherein the at least one bicycle holder structure is mounted on an inner side section of a top surface of the tailgate pad body;
such that the at least one bicycle holder structure is configured to detachably secure a bicycle, such that a bicycle frame of the bicycle is detachably attached to the at least one bicycle holder structure.

25. A tailgate locking system, comprising:
a) a tailgate pad body, which is configured to be mounted on a tailgate of a vehicle; and
b) at least one bicycle holder structure, comprising:
 a holder connector, which is connected to a first side of the at least one bicycle holder structure; and
 a tightening strap, which is connected to a second side of the at least one bicycle holder structure, such that the tightening strap is configured to detachably connect to the holder connector;
wherein the at least one bicycle holder structure is mounted on an inner side section of a top surface of the tailgate pad body;
such that the at least one bicycle holder structure is configured to detachably secure a bicycle, such that a bicycle frame of the bicycle is detachably attached to the at least one bicycle holder structure, whereby the tightening strap is configured to secure the bicycle frame to the at least one bicycle holder structure.

26. A tailgate locking system, comprising:
a) a tailgate pad body, which is configured to be mounted on a tailgate of a vehicle; and
b) at least one bicycle holder structure, comprising;
wherein the at least one bicycle holder structure is mounted on an inner side section of a top surface of the tailgate pad body;
such that the at least one bicycle holder structure is configured to detachably secure a bicycle, such that a bicycle frame of the bicycle is detachably attached to the at least one bicycle holder structure;
wherein the at least one bicycle holder structure further comprises:
 a lifting base, which provides cushioning for the bicycle frame;
 a left elongated protrusion, which is mounted on a left side of a top of the lifting base, such that the left elongated protrusion is configured to support a left side of the bicycle frame; and
 a right elongated protrusion which is mounted on a right side of the top of the lifting base, such that the right elongated protrusion is configured to support a right side of the bicycle frame
 wherein the left elongated protrusion and the right elongated protrusion are parallel;
 such that a central elongated aperture is defined between the left elongated protrusion and the right elongated protrusion, such that the central elongated aperture is configured to receive the bicycle frame.

\* \* \* \* \*